US012630700B2

(12) United States Patent
Ishihara et al.

(10) Patent No.: US 12,630,700 B2
(45) Date of Patent: May 19, 2026

(54) RESIN COMPOSITION AND MOLDED ARTICLE

(71) Applicant: MITSUI CHEMICALS, INC., Tokyo (JP)

(72) Inventors: Shota Ishihara, Ichihara (JP); Masakazu Tanaka, Yokohama (JP); Toyoaki Sasaki, Narashino (JP)

(73) Assignee: MITSUI CHEMICALS, INC., Tokyo (JP)

( * ) Notice: Subject to any disclaimer, the term of this patent is extended or adjusted under 35 U.S.C. 154(b) by 555 days.

(21) Appl. No.: 18/023,339

(22) PCT Filed: Aug. 30, 2021

(86) PCT No.: PCT/JP2021/031652
§ 371 (c)(1),
(2) Date: Feb. 24, 2023

(87) PCT Pub. No.: WO2022/050208
PCT Pub. Date: Mar. 10, 2022

(65) Prior Publication Data

US 2023/0331969 A1 Oct. 19, 2023

(30) Foreign Application Priority Data

Sep. 1, 2020 (JP) ................................ 2020-146887

(51) Int. Cl.

*C08L 23/20* (2025.01)
*C08F 210/14* (2006.01)
*H01G 4/18* (2006.01)

(52) U.S. Cl.

CPC ............ *C08L 23/20* (2013.01); *C08F 210/14* (2013.01); *H01G 4/18* (2013.01); *C08L 2201/08* (2013.01); *C08L 2201/10* (2013.01); *C08L 2203/16* (2013.01); *C08L 2203/20* (2013.01); *C08L 2205/025* (2013.01)

(58) Field of Classification Search

CPC .. C08L 23/20; C08L 2201/08; C08L 2201/10; C08L 2203/16; C08L 2203/20; C08L 2205/025; C08L 2203/206; H01G 4/18; H01G 4/32; H01G 4/20; C08F 4/65912; C08F 210/14; C08J 2323/20; C08J 5/18; Y02T 10/70

See application file for complete search history.

(56) References Cited

U.S. PATENT DOCUMENTS

| | | | | |
|---|---|---|---|---|
| 9,902,847 | B2 | 2/2018 | Tanaka et al. | |
| 11,485,815 | B2 | 11/2022 | Tanaka et al. | |
| 12,091,536 | B2 * | 9/2024 | Hashimoto | C08J 5/18 |
| 2014/0342111 | A1 | 11/2014 | Tanaka et al. | |
| 2021/0032397 | A1 | 2/2021 | Tanaka et al. | |
| 2022/0041847 | A1 * | 2/2022 | Hashimoto | H01G 4/18 |

FOREIGN PATENT DOCUMENTS

| | | | |
|---|---|---|---|
| JP | 2014-011181 | A | 1/2014 |
| JP | 2014-011182 | A | 1/2014 |
| JP | 2014-011183 | A | 1/2014 |
| JP | 2014011181 | * | 1/2014 |
| JP | 2018-162408 | A | 10/2018 |
| WO | WO-2013/099876 | A1 | 7/2013 |
| WO | WO-2019/198694 | A1 | 10/2019 |
| WO | WO-2020/116368 | A1 | 6/2020 |

* cited by examiner

*Primary Examiner* — Kumar R Bhushan
(74) *Attorney, Agent, or Firm* — Foley & Lardner LLP

(57) ABSTRACT

The present invention provides a resin composition including a 4-methyl-1-pentene copolymer (A) that satisfies particular requirements and a 4-methyl-1-pentene copolymer (B) that satisfies particular requirements. The resin composition of the present invention can provide a smooth film with a small surface roughness and can be suitably used for molded articles such as films for capacitors, while containing the 4-methyl-1-pentene copolymers and having properties such as heat resistance. A film for capacitors of the present invention has a small surface roughness and is smooth, which eliminates problems such as worsening of dielectric properties and shortening of service life.

7 Claims, No Drawings

RESIN COMPOSITION AND MOLDED ARTICLE

CROSS-REFERENCE TO RELATED APPLICATIONS

The present application claims priority under 35 U.S.C. § 371 to International Patent Application No. PCT/JP2021/031652, filed Aug. 30, 2021, which claims priority to and the benefit of Japanese Patent Application No. 2020-146887, filed on Sep. 1, 2020. The contents of these applications are hereby incorporated by reference in their entireties.

TECHNICAL FIELD

The present invention relates to a resin composition containing 4-methyl-1-pentene copolymers and a molded article, such as a film for capacitors, including the resin composition.

BACKGROUND ART

4-Methyl-1-pentene polymers are superior to polyethylene and polypropylene in terms of properties such as heat resistance, transparency, and electrical properties, and are thus widely used in a variety of applications. Specifically, a film for capacitors composed of a 4-methyl-1-pentene copolymer is known.

Patent Document 1 describes a 4-methyl-1-pentene (co) polymer composition in which a 4-methyl-1-pentene (co) polymer and a 4-methyl-1-pentene-α-olefin copolymer are mixed in a particular ratio, and describes that a hollow molded article composed of such a composition has excellent transparency, heat resistance, electrical properties, mechanical properties, uniform stretchability, and dimensional stability.

Patent Document 2 describes that a film for capacitors obtained from a 4-methyl-1-pentene copolymer with particular physical properties has electrical properties such that the decreasing rate of electrostatic capacitance is small and dielectric loss properties are stable at a high temperature and under a long-term charge.

Patent Document 3 describes that a 4-methyl-1-pentene copolymer composition including a particular 4-methyl-1-pentene (co)polymer and a 4-methyl-1-pentene copolymer (B) has high impact resistance while possessing transparency and rigidity, and also has high heat resistance.

Patent Document 4 describes that a particular 4-methyl-1-pentene polymer particle can reduce its rigidity, that is, improve its flexibility, without sacrificing properties such as high stereoregularity and excellent heat resistance.

CITATION LIST

Patent Documents

Patent Document 1: WO 2013/099876
Patent Document 2: JP-A-2014-11182
Patent Document 3: JP-A-2018-162408
Patent Document 4: WO 2019/198694

SUMMARY OF INVENTION

Technical Problem

Films for capacitors need to prevent strong blocking between the films in order to properly operate the security function, and the surface roughness thereof are required to be controlled properly. In addition, films for capacitors have problems such as worsening of dielectric properties and shortening of service life if the surface roughness is too rough.

With the 4-methyl-1-pentene copolymers and other materials described in the above Patent Documents, it was not possible to obtain a film that satisfies both the properties applicable to capacitors (for example, electrical properties, heat resistance, and stretchability) and the need to suppress surface roughness to a small degree.

An object of the present invention is to provide a resin composition containing a 4-methyl-1-pentene copolymer, wherein the resin composition has properties such as heat resistance, can provide a smooth film with a small surface roughness, and can be suitably used for molded articles such as films for capacitors.

Solution to Problem

The present inventors have conducted diligent research in order to solve the problems described above. As a result, they have found that a resin composition including two particular 4-methyl-1-pentene copolymers in a particular ratio can solve the above problems, thereby completing the present invention.

The present invention relates to, for example, the following [1] to [7].

[1] A resin composition comprising a 4-methyl-1-pentene copolymer (A) that satisfies the following requirements (A-a) to (A-d) and a 4-methyl-1-pentene copolymer (B) that satisfies the following requirements (B-a) to (B-d), wherein the resin composition satisfies the following requirements (1) and (2):

(A-a) in the copolymer (A), an amount (U1) of constitutional units derived from 4-methyl-1-pentene is 80.0 to 99.9% by mol and a total amount (U2) of constitutional units derived from at least one selected from linear α-olefins having 2 to 20 carbon atoms is 20.0 to 0.1% by mol (provided that U1 and U2 in total is 100% by mol);

(A-b) an intrinsic viscosity $[\eta]_A$ measured in decalin of 135° C. of the copolymer (A) is 0.5 to 5.0 dL/g;

(A-c) when the copolymer (A) is measured in a cross fractionation chromatograph apparatus (CFC) using an infrared spectrophotometer as a detector part, at least one peak of an amount of a component eluted is present in a range of 100 to 140° C.;

(A-d) when the copolymer (A) is measured in the CFC, a molecular weight distribution (Mw/Mn), which is a ratio between a weight average molecular weight (Mw) and a number average molecular weight (Mn), in the component eluted in a range of 100 to 140° C. is 1.0 to 4.5;

(B-a) in the copolymer (B), an amount (U3) of constitutional units derived from 4-methyl-1-pentene is 20.0 to 98.0% by mol and a total amount (U4) of constitutional units derived from at least one selected from linear α-olefins having 2 to 20 carbon atoms is 80.0 to 2.0% by mol (provided that U3 and U4 in total is 100% by mol);

(B-b) an intrinsic viscosity $[\eta]_B$ measured in decalin of 135° C. of the copolymer (B) is 2.0 to 8.0 dL/g;

(B-c) when the copolymer (B) is measured in a cross fractionation chromatograph apparatus (CFC) using an infrared spectrophotometer as a detector part, at least one peak of an amount of a component eluted is present in a range of 0° C. or higher and lower than 100° C.;

(B-d) when the copolymer (B) is measured in the CFC, a molecular weight distribution (Mw/Mn), which is a ratio between a weight average molecular weight (Mw) and a number average molecular weight (Mn), in the component eluted in a range of 0° C. or higher and lower than 100° C. is 1.0 to 7.0;

(1) a content of the copolymer (A) is 5 to 95 parts by mass and a content of the copolymer (B) is 95 to 5 parts by mass with respect to 100 parts by mass of the total content of the copolymers (A) and (B); and (2) a value (U4-U2) obtained by subtracting U2 (% by mol) described in the requirement (A-a) from U4 (% by mol) described in the requirement (B-a) is 0% by mol or more and 6.5% by mol or less.

[2] The resin composition according to [1], wherein the content of the copolymer (A) is 5 parts by mass or more and less than 50 parts by mass and the content of the copolymer (B) is greater than 50 parts by mass and 95 parts by mass or less with respect to 100 parts by mass of the total content of the copolymers (A) and (B).

[3] The resin composition according to [1] or [2], wherein the linear α-olefins in the copolymers (A) and (B) are each independently a linear α-olefin having 10 to 20 carbon atoms.

[4] A molded article comprising the resin composition according to any of [1] to [3].

[5] A film comprising the resin composition according to any of [1] to [3].

[6] A film satisfying the following requirements (I) to (III):

(I) at least two 4-methyl-1-pentene copolymers are contained;

(II) a surface roughness (Ra) of the film is less than 100 nm; and (III) a surface roughness (Rz) of the film is less than 500 nm.

[7] The film according to [5] or [6], wherein the film is a film for capacitors.

Advantageous Effects of Invention

A resin composition of the present invention can provide a smooth film with a small surface roughness and can be suitably used for molded articles such as films for capacitors, while containing 4-methyl-1-pentene copolymers and having properties such as heat resistance. A film for capacitors of the present invention has a small surface roughness and is smooth, which eliminates problems such as worsening of dielectric properties and shortening of service life.

DESCRIPTION OF EMBODIMENTS

In the following description, various types of physical properties will be described, and details of the measurement conditions for each of the physical properties will be given in the Examples section.

[Resin Composition]

A resin composition of the present invention contains a 4-methyl-1-pentene copolymer (A) and a 4-methyl-1-pentene copolymer (B), which will be described below, and satisfies the following requirements (1) and (2).

4-Methyl-1-pentene Copolymer (A)

The 4-methyl-1-pentene copolymer (A) (hereinafter, this may also be referred to as the "copolymer (A)") has constitutional units derived from 4-methyl-1-pentene and constitutional units derived from a linear α-olefin having 2 to 20 carbon atoms, and satisfies the following requirements (A-a) to (A-d). It is preferable that the copolymer (A) should further satisfy the following requirement (A-e).

The copolymer (A) may include only one kind of copolymer or two or more kinds of copolymers. When the copolymer (A) includes two or more kinds of copolymers, it is preferable that each copolymer should satisfy the requirements (A-a) to (A-e).

<<Requirement (A-a)>>

In the copolymer (A), the amount (U1) of constitutional units derived from 4-methyl-1-pentene is 80.0 to 99.9% by mol and the total amount (U2) of constitutional units derived from at least one selected from linear α-olefins having 2 to 20 carbon atoms is 20.0 to 0.1% by mol. U1 is preferably 85.0 to 99.9% by mol, and is more preferably 90.0 to 99.9% by mol. U2 is preferably 15.0 to 0.1% by mol, and is more preferably 10.0 to 0.1% by mol. Note that U1 and U2 in total is 100% by mol. This 100% by mol merely means U1 and U2 in total, and does not mean 100% by mol of the entire constitutional units constituting the copolymer (A).

Examples of the linear α-olefin having 2 to 20 carbon atoms include, for example, ethylene, propylene, 1-butene, 1-pentene, 1-hexene, 1-octene, 1-decene, 1-dodecene, 1-tetradecene, 1-hexadecene, 1-heptadecene, 1-octadecene, and 1-eicosene. In the present specification, ethylene shall be encompassed within α-olefins. Among these, from the viewpoint that a smooth film with a smaller surface roughness can be obtained from the resin composition of the present invention, linear α-olefins having 10 to 20 carbon atoms are preferable, and linear α-olefins having 10 to 18 carbon atoms are more preferable. Specifically, 1-decene, 1-tetradecene, 1-hexadecene, and 1-octadecene are preferable. For example, as the linear α-olefin having 2 to 20 carbon atoms, it is preferable to use 1-hexadecene and 1-octadecene in combination.

The copolymer (A) may have only one kind of constitutional units derived from a linear α-olefin having 2 to 20 carbon atoms, or may have two or more kinds.

The copolymer (A) can further have constitutional units derived from an other polymerizable compound other than 4-methyl-1-pentene and linear α-olefins having 2 to 20 carbon atoms, to the extent that the purpose of the present invention is not impaired. Examples of the other polymerizable compound include, for example, branched α-olefins having 20 or less carbon atoms other than 4-methyl-1-pentene; vinyl compounds having a cyclic structure such as styrene, vinylcyclopentene, vinylcyclohexane, and vinylnorbornane; vinyl esters such as vinyl acetate; unsaturated organic acids or derivatives thereof such as maleic anhydride; conjugated dienes such as butadiene, isoprene, pentadiene, and 2,3-dimethylbutadiene; and nonconjugated polyenes such as 1,4-hexadiene, 1,6-octadiene, 2-methyl-1,5-hexadiene, 6-methyl-1,5-heptadiene, 7-methyl-1,6-octadiene, dicyclopentadiene, cyclohexadiene, dicyclooctadiene, methylene norbornene, 5-vinylnorbornene, 5-ethylidene-2-norbornene, 5-methylene-2-norbornene, 5-isopropylidene-2-norbornene, 6-chloromethyl-5-isopropenyl-2-norbornene, 2,3-diisopropylidene-5-norbornene, 2-ethylidene-3-isopropylidene-5-norbornene, and 2-propenyl-2, 2-norbornadiene.

In the copolymer (A), the content of constitutional units derived from the other polymerizable compound is normally 10% by mol or less, preferably 5% by mol or less, and more preferably 3% by mol or less out of 100% by mol of the entire constitutional units constituting the copolymer (A).

<<Requirement (A-b)>>

The copolymer (A) has an intrinsic viscosity $[\eta]_A$ of 0.5 to 5.0 dL/g measured in decalin of 135° C. The $[\eta]_A$ is preferably 0.5 to 4.5 dL/g, and is more preferably 0.5 to 4.0 dL/g.

The copolymer (A) having $[\eta]_A$ within the above range exhibits good flowability during preparation and molding of the resin composition. The present inventors assume that the copolymer (A) contributes to improved stretchability when further combined with the 4-methyl-1-pentene copolymer (B).

<<Requirement (A-c)>>

When the copolymer (A) is measured in a cross fractionation chromatograph apparatus (CFC) using an infrared spectrophotometer as a detector part, at least one peak of the amount of a component eluted is present in the range of 100 to 140° C. The peak of the amount of a component eluted is preferably present in the range of 100 to 135° C. Note that the position of the peak of the amount of a component eluted is determined based on the position of the peak top.

It is preferable that the copolymer (A) should have no peak of the amount of a component eluted in the range of 0° C. or higher and lower than 100° C.

The copolymer (A) satisfying the requirement (A-c) contains a component with high crystallinity, and the molded article to be obtained tends to exhibit high heat resistance.

The content of a component eluted at 135° C. or higher in the entire amount of a component eluted in a range of 0 to 145° C. of the copolymer (A) is preferably 30% by mass or less, more preferably 25% by mass or less, and still more preferably 20% by mass or less. The copolymer (A) satisfying this requirement is preferable from the viewpoint of uniform stretchability.

<<Requirement (A-d)>>

When the copolymer (A) is measured in a cross fractionation chromatograph apparatus (CFC) using an infrared spectrophotometer as a detector part, the molecular weight distribution (Mw/Mn), which is the ratio between the weight average molecular weight (Mw) and the number average molecular weight (Mn), in a component eluted in the range of 100 to 140° C. is 1.0 to 4.5. The Mw/Mn is preferably 1.5 to 4.5, and is more preferably 2.0 to 4.5. The respective average molecular weights described above are measured by the gel permeation chromatography (GPC) method, and are values in terms of polystyrene.

The resin composition including the copolymer (A) having Mw/Mn within the above range tends to have a low content of a relatively low molecular weight component. Therefore, the possibility of a decrease in the transparency of the molded article due to bleedout of the low molecular weight component and the possibility of the low molecular weight component weakening the crystal structure are reduced. As a result, the present inventors assume that this provides a favorable effect on the mechanical properties of the molded article.

The copolymer (A) having Mw/Mn within the above range can be obtained by, for example, using a metallocene catalyst, which will be mentioned later.

<<Requirement (A-e)>>

The copolymer (A) has a melting point (Tm) measured with a differential scanning calorimeter (DSC) of preferably 210 to 260° C., more preferably 220 to 260° C., and still more preferably 225 to 260° C.

The melting point tends to be dependent on the stereoregularity of the copolymer and the content of constitutional units derived from a linear α-olefin having 2 to 20 carbon atoms. The melting point can be adjusted by using a metallocene catalyst, which will be mentioned later, and by controlling the content of the constitutional units described above.

The copolymer (A) having a melting point within the above range is preferable from the viewpoint of heat resistance and moldability.

4-Methyl-1-pentene Copolymer (B)

The 4-methyl-1-pentene copolymer (B) (hereinafter, this may also be referred to as the "copolymer (B)") has constitutional units derived from 4-methyl-1-pentene and constitutional units derived from a linear α-olefin having 2 to 20 carbon atoms, and satisfies the following requirements (B-a) to (B-d). It is preferable that the copolymer (B) should further satisfy the following requirement (B-e). It is preferable that the copolymer (B) should further satisfy the following requirement (B-f).

The copolymer (B) may include only one kind of copolymer or two or more kinds of copolymers. When the copolymer (B) includes two or more kinds of copolymers, it is preferable that each copolymer should satisfy the requirements (B-a) to (B-f).

<<Requirement (B-a)>>

In the copolymer (B), the amount (U3) of constitutional units derived from 4-methyl-1-pentene is 20.0 to 98.0% by mol and the total amount (U4) of constitutional units derived from at least one selected from linear α-olefins having 2 to 20 carbon atoms is 80.0 to 2.0% by mol. U3 is preferably 20.0 to 97.0% by mol, and is more preferably 25.0 to 97.0% by mol. U4 is preferably 80.0 to 3.0% by mol, and is more preferably 75.0 to 3.0% by mol. Note that U3 and U4 in total is 100% by mol. This 100% by mol merely means U3 and U4 in total, and does not mean 100% by mol of the entire constitutional units constituting the copolymer (B).

Examples of the linear α-olefin having 2 to 20 carbon atoms include, for example, ethylene, propylene, 1-butene, 1-pentene, 1-hexene, 1-octene, 1-decene, 1-dodecene, 1-tetradecene, 1-hexadecene, 1-heptadecene, 1-octadecene, and 1-eicosene. Among these, from the viewpoint that the molded article obtained from the resin composition of the present invention can be stretched to a higher degree and can also maintain high transparency even after stretching, linear α-olefins having 10 to 20 carbon atoms are preferable, and linear α-olefins having 10 to 18 carbon atoms are more preferable. Specifically, 1-decene, 1-tetradecene, 1-hexadecene, and 1-octadecene are preferable. For example, as the linear α-olefin having 2 to 20 carbon atoms, it is preferable to use 1-hexadecene and 1-octadecene in combination.

The copolymer (B) may have only one kind of constitutional units derived from a linear α-olefin having 2 to 20 carbon atoms, or may have two or more kinds.

The copolymer (B) can further have constitutional units derived from an other polymerizable compound, as mentioned above in the copolymer (A), to the extent that the purpose of the present invention is not impaired.

In the copolymer (B), the content of constitutional units derived from the other polymerizable compound is normally 10% by mol or less, preferably 5% by mol or less, and more preferably 3% by mol or less out of 100% by mol of the entire constitutional units constituting the copolymer (B).

<<Requirement (B-b)>>

The copolymer (B) has an intrinsic viscosity $[\eta]_B$ of 2.0 to 8.0 dL/g measured in decalin of 135° C. The $[\eta]_B$ is preferably 2.5 to 7.5 dL/g, more preferably 2.7 to 7.0 dL/g, still more preferably 3.0 to 7.0 dL/g, and particularly preferably 3.5 to 7.0 dL/g.

The copolymer (B) having $[\eta]_B$ within the above range exhibits good flowability during preparation and molding of the resin composition. The present inventors assume that the copolymer (B) also contributes to improved stretchability when further combined with the 4-methyl-1-pentene copolymer (A). In particular, when the $[\eta]_B$ is the lower limit value described above or more, there is a tendency for the film to be obtained to have more excellent stretchability and more excellent rigidity.

<<Requirement (B-c)>>

When the copolymer (B) is measured in a cross fractionation chromatograph apparatus (CFC) using an infrared spectrophotometer as a detector part, at least one peak of the amount of a component eluted is present in the range of 0° C. or higher and lower than 100° C. The peak of the amount of a component eluted is preferably present in the range of 0 to 80° C. Note that the position of the peak of the amount of a component eluted is determined based on the position of the peak top.

It is preferable that the copolymer (B) should have no peak of the amount of a component eluted in the range of 100° C. to 140° C.

The copolymer (B) satisfying the requirement (B-c) contains a component with relatively low crystallinity compared to the copolymer (A), and the molded article to be obtained tends to exhibit high flexibility.

<<Requirement (B-d)>>

When the copolymer (B) is measured in a cross fractionation chromatograph apparatus (CFC) using an infrared spectrophotometer as a detector part, the molecular weight distribution (Mw/Mn), which is the ratio between the weight average molecular weight (Mw) and the number average molecular weight (Mn), in a component eluted in the range of 0° C. or higher and lower than 100° C. is 1.0 to 7.0. The Mw/Mn is preferably 1.0 to 6.5, and is more preferably 1.2 to 6.0. The respective average molecular weights described above are measured by the gel permeation chromatography (GPC) method, and are values in terms of polystyrene.

The resin composition including the copolymer (B) having Mw/Mn within the above range tends to have a low content of a relatively low molecular weight component. Therefore, the possibility of a decrease in the transparency of the molded article due to bleedout of the low molecular weight component and the possibility of the low molecular weight component weakening the crystal structure are reduced. As a result, the present inventors assume that this provides a favorable effect on the mechanical properties of the molded article.

The copolymer (B) having Mw/Mn within the above range can be obtained by, for example, using a metallocene catalyst, which will be mentioned later.

<<Requirement (B-e)>>

In one embodiment, when the copolymer (B) is measured in a cross fractionation chromatograph apparatus (CFC) using an infrared spectrophotometer as a detector part, the number average molecular weight (Mn) of a component eluted at 0° C. is 5000 or more, or no component eluted at 0° C. is present.

The copolymer (B) containing a component eluted at 0° C. in the CFC contains a component with very low crystallinity (or completely amorphous). The copolymer (B) in which the Mn of a component eluted at 0° C. is 5000 or more is normally a high comonomer containing body with very low crystallinity. Such a polymer has low crystallinity but a high molecular weight, which is preferable from the viewpoint that it is thought to be less likely to cause a decrease in transparency of the molded article due to bleedout of a low molecular weight component or cause roll staining during film molding. In copolymers polymerized using a metallocene catalyst, there is a tendency that the Mn of a component eluted at 0° C. is large or that no component eluted at 0° C. is present.

In the copolymer (B), the Mn of a component eluted at 0° C. is preferably 15000 or more, and is more preferably 20000 or more. The upper limit of the Mn is not particularly limited, and may be, for example, one million. The content of a component eluted at 0° C. in the entire amount of a component eluted at 0 to 145° C. of the copolymer (B) is not particularly limited, and it is preferably 20% by mass or less, and more preferably 10% by mass or less.

<<Requirement (B-f)>>

In the copolymer (B), preferably, the melting point (Tm) measured with a differential scanning calorimeter (DSC) is 220° C. or lower, or no peak indicating the melting point appears in the DSC measurement; more preferably, the melting point (Tm) is 210° C. or lower, or no peak indicating the melting point appears in the DSC measurement; and still more preferably, the melting point (Tm) is 100 to 200° C., or no peak indicating the melting point appears in the DSC measurement.

The copolymer (B) satisfying the requirement (B-f) is preferable from the viewpoint of stretchability.

<Requirement (1)>

In the resin composition of the present invention, the content of the copolymer (A) is 5 to 95 parts by mass and the content of the copolymer (B) is 95 to 5 parts by mass with respect to 100 parts by mass of the total content of the copolymers (A) and (B).

When the contents of the copolymers (A) and (B) are within the above ranges, the molded article to be obtained tends to have a good balance between rigidity and extensibility.

Furthermore, in the resin composition of the present invention, if the content of the copolymer (B) is greater than that of the copolymer (A), it is preferable in terms of further improved stretchability. Specifically, the content of the copolymer (A) is preferably 5 parts by mass or more and less than 50 parts by mass, more preferably 10 to 40 parts by mass, still more preferably 15 to 38 parts by mass, and particularly preferably 15 to 35 parts by mass, and the content of the copolymer (B) is preferably greater than 50 parts by mass and 95 parts by mass or less, more preferably 60 to 90 parts by mass, still more preferably 62 to 85 parts by mass, and particularly preferably 65 to 85 parts by mass with respect to 100 parts by mass of the total content of the copolymers (A) and (B).

<Requirement (2)>

In the resin composition of the present invention, a value (U4-U2) obtained by subtracting U2 (% by mol) described in the requirement (A-a) from U4 (% by mol) described in the requirement (B-a) is 0% by mol or more and 6.5% by mol or less.

That is, there is no or small difference in the comonomer content in the copolymers (A) and (B). Satisfying this requirement provides good miscibility between the copolymers (A) and (B) in the resin composition, resulting in a smaller surface roughness and a smoother film when the film is molded.

The difference (U4-U2) is preferably 0% by mol or more and 5.5% by mol or less, more preferably 0% by mol or more and 5.0% by mol or less, still more preferably 0% by mol or more and 4.5% by mol or less, and particularly preferably 0% by mol or more and 4.0% by mol or less.

The "miscibility" in the present invention means the nature by which components are evenly mixed with each other in one phase. Note that "compatibility" means the nature by which the sea phase and the island phase of a sea-island structure are dispersed, and is different from miscibility.

In the resin composition of the present invention, the intrinsic viscosity [η] measured in decalin of 135° C. is normally 2.0 to 8.0 dL/g, preferably 2.5 to 7.0 dL/g, more preferably 2.8 to 6.0 dL/g, still more preferably 3.0 to 5.0 dL/g, and particularly preferably 3.3 to 4.5 dL/g. When the intrinsic viscosity [η] is higher than 8.0 dL/g, the moldability tends to be poor, and when the intrinsic viscosity [η] is lower than 2.0 dL/g, the stretchability tends to be worsened.

In the resin composition of the present invention, the content of the comonomer copolymerized with 4-methyl-1-pentene included in the resin composition is normally 1.0 to 6.0% by mol, preferably 1.5 to 5.5% by mol, more preferably 2.0 to 5.0% by mol, still more preferably 2.5 to 5.0% by mol, particularly preferably 2.5 to 4.7% by mol, and most preferably 2.5 to 4.5% by mol. When the content of the comonomer is higher than 6.0% by mol, the dielectric breakdown strength tends to be decreased, and when the content of the comonomer is lower than 1.0% by mol, the stretchability tends to be worsened.

Note that the total of the above comonomer content can also be calculated as an average value considering the mass ratio of the contents of the comonomer copolymerized with 4-methyl-1-pentene in the copolymers (A) and (B). For example, the comonomer content in the composition of Example 1 can be calculated using the following expression.

Comonomer content=(1.4% by mol×35% by mass+4.6% by mol×75% by mass)/(35% by mass+75% by mass)=3.4% by mol.

When the resin composition of the present invention is measured in a cross fractionation chromatograph apparatus (CFC) using an infrared spectrophotometer as a detector part, it is preferable that at least one peak of the amount of a component eluted should be present in the range of 100 to 140° C. and at least one peak of the amount of a component eluted should be present in the range of 0° C. or higher and lower than 100° C.

The resin composition of the present invention has a melting point (Tm) of normally 200 to 260° C., preferably 205 to 250° C., more preferably 210 to 240° C., and still more preferably 215 to 230° C. The melting point (Tm) can be measured for the composition before being made into a molded article, or it can be measured for a molded article such as a film obtained solely from the resin composition.

<Total Content of Copolymers (A) and (B) in Resin Composition>

In the resin composition of the present invention, the total content of the copolymers (A) and (B) is normally 50% by mass or more, preferably 60% by mass or more, and more preferably 70% by mass or more. The upper limit of the content of the copolymers (A) and (B) may be 100% by mass of the resin composition. When the resin composition contains other components (for example, other polymer components and additives, which will be mentioned later), the upper limit described above is defined by the content of the other components.

The resin composition of the present invention can contain one kind or two or more kinds of copolymers (A). Also, the resin composition of the present invention can contain one kind or two or more kinds of copolymers (B).

The copolymer (A) has a relatively low intrinsic viscosity [η] compared to the copolymer (B) and is also a rigid component, and the copolymer (B) is a relatively soft component. The present inventors assume that hardness of each polymer is attributed to the content of the comonomer included in each polymer. Since the resin composition of the present invention contains these copolymers (A) and (B), the molded article to be obtained from such a resin composition has excellent stretchability while maintaining the transparency and heat resistance derived from the 4-methyl-1-pentene copolymers. Accordingly, the resin composition of the present invention is suited for the production of films for capacitors that require heat resistance and stretchability.

<Method for Producing Copolymers (A) and (B)>

Both copolymer (A) and copolymer (B) can be obtained by polymerizing, for example, 4-methyl-1-pentene, a linear α-olefin having 2 to 20 carbon atoms, and, if necessary, the other polymerizable compound as described above. By carrying out the polymerization in the presence of a metallocene catalyst, the copolymers (A) and (B) that satisfy each of the requirements described above can be suitably obtained.

Examples of the metallocene catalyst include, for example, metallocene catalysts described in WO 01/53369, WO 01/27124, JPH3-193796, JPH02-41303, WO 06/025540, or WO 2013/099876.

Examples of the metallocene catalyst include, for example, a catalyst at least constituted from:

a metallocene compound (a); and a carrier (b).

<<Metallocene Compound (a)>>

A metallocene compound (a) is represented by, for example, a general formula (1) or (2).

[Chem. 1]

(1)

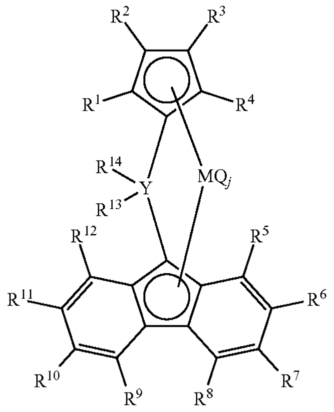

-continued (2)

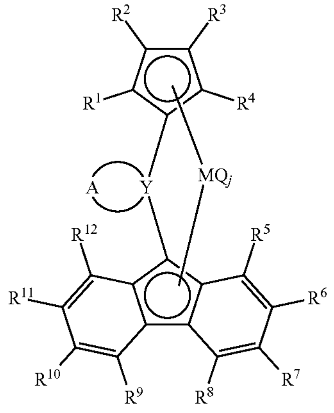

The meaning of each symbol in the general formula (1) or (2) is as follows.

$R^1$ to $R^{14}$ are each independently a hydrogen atom, a hydrocarbon group, a substituted hydrocarbon group, or a silicon containing group. Adjacent substituents among $R^1$ to $R^4$ may be bonded to each other to form a ring. Adjacent substituents among $R^5$ to $R^{12}$ may be bonded to each other to form a ring.

Y is a carbon atom or a silicon atom.

A is a divalent hydrocarbon group having 2 to 20 carbon atoms that may include an unsaturated bond and/or an aromatic ring. A may contain two or more ring structures, including the ring formed together with Y.

M is a metal selected from Group 4 of the periodic table (transition metal), and examples thereof include, for example, titanium, zirconium, and hafnium.

Q is a halogen atom, a hydrocarbon group having 1 to 20 carbon atoms, an anion ligand, or a neutral ligand that is capable of being coordinated with a lone electron pair. When j is 2 or more, each Q may be the same as or different from each other.

j is an integer of 1 to 4, and is preferably 2.

Examples of the hydrocarbon group in $R^1$ to $R^{14}$ include, for example, hydrocarbon groups having 1 to 20 carbon atoms, and specific examples thereof include alkyl groups having 1 to 20 carbon atoms, cycloalkyl groups having 3 to 20 carbon atoms, arylalkyl groups having 7 to 20 carbon atoms, aryl groups having 6 to 20 carbon atoms, and alkylaryl groups having 7 to 20 carbon atoms.

The substituted hydrocarbon group in $R^1$ to $R^{14}$ (note that the silicon containing group is excluded) is a group in which a part of or all hydrogen atoms included in the hydrocarbon group are substituted with functional groups such as halogen atoms (fluorine, chlorine, bromine, or iodine), hydroxy groups and amino groups.

Examples of the silicon containing group in $R^1$ to $R^{14}$ include, for example, alkylsilyl groups or arylsilyl groups having 1 to 4 silicon atoms and 3 to 20 carbon atoms, and specific examples thereof include trimethylsilyl, tert-butyldimethylsilyl, and triphenylsilyl.

Adjacent substituents among $R^5$ to $R^{12}$ on the fluorene ring may be bonded to each other to form a ring. Examples of such a substituted fluorenyl group include, for example, benzofluorenyl, dibenzofluorenyl, octahydrodibenzofluorenyl, and octamethyloctahydrodibenzofluorenyl.

It is preferable that the substituents $R^5$ to $R^{12}$ on the fluorene ring should be left-right symmetric, that is, $R^5$=$R^{12}$, $R^6$=$R^{11}$, $R^7$=$R^{10}$, and $R^8$=$R^9$, for ease of synthesis. The fluorene ring moiety is preferably unsubstituted fluorene, 3,6-disubstituted fluorene, 2,7-disubstituted fluorene, or 2,3,6,7-tetrasubstituted fluorene. Position 3, position 6, position 2, and position 7 on the fluorene ring correspond to $R^7$, $R^{10}$, $R^6$, and $R^{11}$, respectively.

It is preferable that $R^{13}$ and $R^{14}$ should be each independently a hydrogen atom, a hydrocarbon group, or a substituted hydrocarbon group.

In the case of general formula (1), $R^{13}$ and $R^{14}$ are bonded to Y and constitute a substituted methylene group or a substituted silylene group as the bridged part. Specific examples of the substituted methylene group and the substituted silylene group include, for example, dialkylmethylene, dicycloalkylmethylene, alkylcycloalkylmethylene, alkylarylmethylene, diarylmethylene, dialkylsilylene, dicycloalkylsilylene, alkylcycloalkylsilylene, alkylarylsilylene, diarylsilylene, and halogenated groups thereof.

In the case of general formula (2), Y is bonded to the divalent hydrocarbon group A described above to constitute a cycloalkylidene group, a cyclomethylenesilylene group, or the like. Specific examples of the cycloalkylidene group and the cyclomethylenesilylene group include, for example, cyclopropylidene, cyclobutylidene, cyclopentylidene, cyclohexylidene, cycloheptylidene, bicyclo[3.3.1]nonylidene, norbornylidene, adamantylidene, tetrahydronaphthylidene, dihydroindanylidene, cyclodimethylenesilylene, cyclotrimethylenesilylene, cyclotetramethylenesilylene, cyclopentamethylenesilylene, cyclohexamethylenesilylene, and cycloheptamethylenesilylene.

For Q, examples of the halogen atom include fluorine, chlorine, bromine, and iodine; examples of the hydrocarbon group having 1 to 20 carbon atoms include the same groups as the hydrocarbon groups of $R^1$ to $R^{14}$; examples of the anion ligand include an alkoxy group, an aryloxy group, a carboxylate group, a sulfonate group, and the like; and examples of the neutral ligand that is capable of being coordinated with a lone electron pair include organophosphorus compounds such as trimethylphosphine, triethylphosphine, triphenylphosphine, and diphenylmethylphosphine; ethers such as tetrahydrofuran, diethyl ether, dioxane, and 1,2-dimethoxyethane; and the like. It is preferable at least one of Q is a halogen atom or an alkyl group having 1 to 20 carbon atoms.

Specific examples of the metallocene compound (a) include, for example, compounds listed in WO 01/27124, WO 2006/025540, or WO 2007/308607.

The metallocene compound (a) is particularly preferably a compound represented by a general formula [A2], as described in WO 2014/050817 or the like.

[Chem. 2]

[A2]

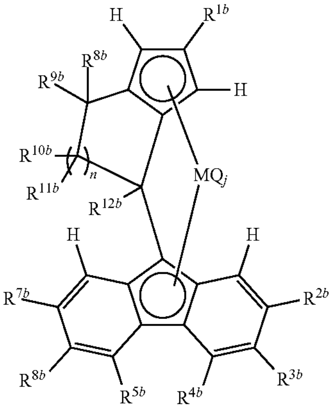

In the formula [A2], Rb is a hydrocarbon group, a silicon containing group, or a halogen containing hydrocarbon group; $R^{2b}$ to $R^{12b}$ are each selected from a hydrogen atom, a hydrocarbon group, a silicon containing group, a halogen atom, and a halogen containing hydrocarbon group and may be the same as or different from each other, and the respective substituents may be bonded to each other to form a ring. M is a transition metal of Group 4 of the periodic table; n is an integer of 1 to 3; Q is as defined in Q in the general formula (1) or (2); and j is an integer of 1 to 4.

Examples of the hydrocarbon group in $R^{1b}$ to $R^{12b}$ include, for example, linear hydrocarbon groups such as a linear alkyl group and a linear alkenyl group; branched hydrocarbon groups such as a branched alkyl group; cyclic saturated hydrocarbon groups such as a cycloalkyl group, a norbornyl group, and an adamantyl group; cyclic unsaturated hydrocarbon groups such as an aryl group and a cycloalkenyl group; groups formed by replacing one or two or more hydrogen atoms that a saturated hydrocarbon group has with cyclic unsaturated hydrocarbon groups, such as an aralkyl group. The number of carbon atoms in the hydrocarbon group is normally 1 to 20, preferably 1 to 15, and more preferably 1 to 10.

Examples of the silicon containing group in $R^{1b}$ to $R^{12b}$ include, for example, groups represented by the formula: —$SiR_3$, wherein a plurality of R each independently represent an alkyl group having 1 to 15 carbon atoms or a phenyl group.

Examples of the halogen containing hydrocarbon group in $R^{1b}$ to $R^{12b}$ include, for example, groups formed by replacing one or two or more hydrogen atoms that the hydrocarbon group described above has with halogen atoms, such as a trifluoromethyl group.

Examples of the halogen atom in $R^{2b}$ to $R^{12b}$ include, for example, a fluorine atom, a chlorine atom, a bromine atom, and an iodine atom.

In the formula [A2], examples of the ring (spiro ring or additional ring) formed by two substituents bonded to each other include, for example, aliphatic rings and aromatic rings. Specific examples thereof include a cyclohexane ring, a benzene ring, a hydrogenated benzene ring, and a cyclopentene ring, and it is preferably a cyclohexane ring, a benzene ring, and a hydrogenated benzene ring. Also, such a ring structure may further have a substituent such as an alkyl group on the ring.

It is particularly preferable that Rb should be a substituent in which the carbon having a free valency (carbon bonded to the cyclopentadienyl ring) is a tertiary carbon. Specific examples of $R^{1b}$ include a tert-butyl group, a tert-pentyl group, a 1-methylcyclohexyl group, and a 1-adamantyl group.

The fluorene ring moiety is not particularly limited as long as the structure is obtained from a publicly known fluorene derivative, but $R^{4b}$ and $R^{5b}$ are each preferably a hydrogen atom from the viewpoint of molecular weight.

$R^{2b}$, $R^{3b}$, $R^{6b}$, and $R^{7b}$ are each preferably a hydrocarbon group having 1 to 20 carbon atoms. Alternatively, $R^{2b}$ and $R^{3b}$ may be bonded to each other to form a ring, and $R^{6b}$ and $R^{7b}$ may be bonded to each other to form a ring. Examples of such a substituted fluorenyl group include, for example, a benzofluorenyl group, a dibenzofluorenyl group, an octahydrodibenzofluorenyl group, a 1,1,4,4,7,7,10,10-octamethyl-2,3,4,7,8,9,10,12-octahydro-1H-dibenzo[b,h]fluorenyl group, a 1,1,3,3,6,6,8,8-octamethyl-2,3,6,7,8,10-hexahydro-1H-dicyclopenta[b,h]fluorenyl group, and a 1',1',3',6',8',8'-hexamethyl-1'H,8'H-dicyclopenta[b,h]fluorenyl group.

It is preferable that $R^{8b}$ should be a hydrogen atom. It is preferable that $R^{9b}$ should be an alkyl group having 2 or more carbon atoms. From the viewpoint of synthesis, it is also preferable that $R^{10b}$ and $R^{11b}$ each should be a hydrogen atom.

Alternatively, in the case of n=1, $R^{9b}$ and $R^{10b}$ are more preferably bonded to each other to form a ring. Particularly preferably, the ring is a 6-membered ring such as a cyclohexane ring. In this case, $R^{11b}$ is preferably a hydrogen atom.

It is preferable that $R^{12b}$ should be an alkyl group.

M is a transition metal of Group 4 of the periodic table, and for example, it is Ti, Zr, or Hf, preferably Zr or Hf, and particularly preferably Zr.

n is an integer of 1 to 3, is preferably 1 or 2, and is more preferably 1. It is preferable that n should be the value described above from the viewpoint of efficiently obtaining the polymer to be produced.

j is an integer of 1 to 4, and is preferably 2.

The compound represented by the general formula [A2] is particularly preferably (8-octamethylfluoren-12'-yl-(2-(adamantan-1-yl)-8-methyl-3,3b,4,5,6,7,7a,8-octahydrocyclopenta[a]indene))zirconium dichloride or (8-(2,3,6,7-tetramethylfluoren)-12'-yl-(2-(adamantan-1-yl)-8-methyl-3,3b,4,5,6,7,7a,8-octahydrocyclopenta[a]indene))zirconium dichloride. In this context, the octamethylfluorene refers to 1,1,4,4,7,7,10,10-octamethyl-2,3,4,7,8,9,10,12-octahydro-1H-dibenzo[b,h]fluorene.

<<Carrier (b)>>

The carrier (b) is preferably in the form of particles, and by immobilizing the metallocene compound (a) on the surface and inside thereof, the metallocene catalyst described above is formed. The catalyst in such a form is generally called a metallocene supported catalyst.

The carrier (b) is composed mainly of an organoaluminum compound (b-1), an organoboron compound (b-2) or an inorganic compound (b-3), or a complex of two or more selected therefrom.

Examples of the organoaluminum compound (b-1) include trialkyl aluminums such as trimethyl aluminum, triethyl aluminum, triisobutyl aluminum, and tri-n-octyl aluminum; dialkyl aluminum hydrides such as diisobutyl aluminum hydride; tricycloalkyl aluminums; and organoaluminum oxy compounds typified by aluminoxanes. Examples of the organoaluminum compound (b-1) can also include organoaluminum oxy compounds including a boron atom, aluminoxanes including halogen as listed in WO 2005/066191 and WO 2007/131010, and ionic aluminoxanes as listed in WO 2003/082879.

Examples of the organoboron compound (b-2) include, for example, trialkylammonium tetraarylborate, trialkylammonium tetra(halogenated aryl)borate, dioctadecylmethylammonium tetraarylborate, dioctadecylmethylammonium tetra(halogenated aryl)borate, N,N-dialkylanilinium tetraarylborate, and N,N-dialkylanilinium tetra(halogenated aryl)borate.

Examples of the inorganic compound (b-3) include, for example, porous oxides, inorganic halides, clays, clay minerals, and ion-exchange lamellar compounds. Examples of the porous oxide include, for example, oxides such as $SiO_2$, $Al_2O_3$, MgO, $ZrO_2$, $TiO_2$, $B_2O_3$, CaO, ZnO, BaO, and $ThO_2$, and complexes or mixtures containing them. For example, natural or synthetic zeolites, $SiO_2$—MgO, $SiO_2$—$Al_2O_3$, $SiO_2$—$TiO_2$, $SiO_2$—$V_2O_5$, $SiO_2$—$Cr_2O_3$, and $SiO_2$—$TiO_2$—MgO can be listed. Examples of the inorganic halide include, for example, $MgCl_2$, $MgBr_2$, $MnCl_2$, and $MnBr_2$. The inorganic halide may be used as it is, or may be used after being crushed with a ball mill or a vibrating mill. Alternatively, the inorganic halide may be dissolved in a solvent such as an alcohol and then precipitated into fine particles, with a precipitating agent, for use.

The carrier (b) is preferably a carrier containing an aluminum atom from the viewpoint of high activity and further suppression in the amount of a solvent-soluble portion. The content of the aluminum atom in the carrier (b) is preferably 20% by mass or more, more preferably 20 to 60% by mass, still more preferably 30 to 50% by mass, and particularly preferably 35 to 47% by mass.

As such a carrier (b), a solid aluminoxane is suitably used, and for example, solid aluminoxanes disclosed in WO 2010/055652, WO 2013/146337, or WO 2014/123212 are particularly suitably used.

The term "solid" means that the aluminoxane substantially maintains a solid state in a reaction environment where the solid aluminoxane is used. More specifically, this term means that, for example, when an olefin polymerization solid catalyst component is prepared by contacting respective components constituting the olefin polymerization catalyst, the aluminoxane is in a solid state in an environment having a specific temperature and pressure in an inert hydrocarbon medium such as hexane or toluene for use in the reaction.

The solid aluminoxane preferably contains an aluminoxane having at least one kind of constitutional units selected from a constitutional unit represented by the following formula (1) and a constitutional unit represented by the following formula (2), more preferably contains an aluminoxane having a constitutional unit represented by the following formula (1), and still more preferably contains a polymethylaluminoxane composed only of a constitutional unit represented by the following formula (1).

[Chem. 3]

(1)

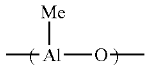

(2)

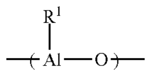

In the formula (1), Me represents a methyl group.

In the formula (2), $R^1$ is a hydrocarbon group having 2 to 20 carbon atoms, is preferably a hydrocarbon group having 2 to 15 carbon atoms, and is more preferably a hydrocarbon group having 2 to 10 carbon atoms. Examples of the hydrocarbon group include, for example, an alkyl group, a cycloalkyl group, and an aryl group.

The structure of the solid aluminoxane has not been completely revealed and is presumed to usually have a configuration with approximately 2 to 50 repeats of the constitutional units represented by the formula (1) and/or the formula (2), though not limited by the configuration. The binding pattern of the constitutional units varies and is, for example, a linear pattern, a cyclic pattern, or a clustered pattern. The aluminoxane is presumed to usually consist of one of these or be a mixture thereof. Alternatively, the aluminoxane may consist of the constitutional unit represented by the formula (1) or the formula (2).

The solid aluminoxane is preferably a solid polymethylaluminoxane, and is more preferably a solid polymethylaluminoxane composed only of the constitutional unit represented by the formula (1).

The solid aluminoxane functions as a catalyst carrier. Hence, in addition to the solid aluminoxane, there is no need to use, as a catalyst carrier, a solid inorganic carrier such as silica, alumina, silica-alumina, or magnesium chloride, or a solid organic carrier such as polystyrene beads.

The solid aluminoxane can be prepared by, for example, a method described in WO 2010/055652 and WO 2014/123212.

<<Organic Compound Component (c)>>

The metallocene catalyst may further contain an organic compound component (c), if necessary. The organic compound component (c) is used, if necessary, for the purpose of improving polymerization performance and the physical properties of the polymer to be produced. As the organic compound component (c), the organoaluminum compound (b-1) mentioned above may be used. Other examples thereof include alcohols, phenolic compounds, carboxylic acids, phosphorus compounds, amides, polyethers, and sulfonates.

<<Polymerization Conditions>>

The polymerization of 4-methyl-1-pentene and the linear α-olefin having 2 to 20 carbon atoms for obtaining the copolymers (A) and (B) can be performed by either liquid phase polymerization methods such as solution polymerization and suspension polymerization or gas phase polymerization methods. In the liquid phase polymerization methods, an inert hydrocarbon solvent can be used, and specific examples thereof include aliphatic hydrocarbons such as propane, butane, pentane, hexane, heptane, octane, decane, dodecane, and kerosene; alicyclic hydrocarbons such as cyclopentane, cyclohexane, methylcyclopentane, and methylcyclohexane; aromatic hydrocarbons such as benzene, toluene, and xylene; halogenated hydrocarbons such as ethylene chloride, chlorobenzene, dichloromethane, trichloromethane, and tetrachloromethane; and mixed solvents of two or more selected therefrom. Alternatively, the olefin itself, including 4-methyl-1-pentene, may be used as the polymerization solvent.

For the olefin polymerization, the method for using each component and the order of addition are arbitrarily selected. Examples thereof include methods as listed below. Hereinafter, the metallocene compound (a), the carrier (b), and the organic compound component (c) are also referred to as "components (a) to (c)", respectively.

(i) A method of adding the component (a) and the component (b) in an arbitrary order to a polymerization reactor.

(ii) A method of adding a catalyst component comprising the component (a) supported by the component (b) to a polymerization reactor.

In each of the methods (i) to (ii), the component (c) may be further added at an arbitrary stage. Also, at least two catalyst components may be contacted in advance.

In the solid catalyst component comprising the component (a) supported by the component (b), an olefin such as 4-methyl-1-pentene or 3-methyl-1-pentene may be prepolymerized. A catalyst component may be further supported on the prepolymerized solid catalyst component.

For polymerizing olefins using a metallocene catalyst, the amount of each component to be used that is capable of constituting the metallocene catalyst is as described below. In the metallocene catalyst, the content of each component can be adjusted as described below.

The component (a) is normally used in an amount of $10^{-10}$ to $10^{-2}$ mol, preferably $10^{-8}$ to $10^{-3}$ mol, per liter of reaction volume. The component (b-1) can be used in an amount of, in terms of the molar ratio [Al/M] between the aluminum atom in the component (b-1) and the entire transition metal atom (M) in the component (a), normally 10 to 10000, preferably 30 to 2000, and particularly preferably 150 to 500. The component (b-2) can be used in an amount of, in terms of the molar ratio [(b-2)/M] between the component (b-2) and the entire transition metal atom (M) in the component (a), normally 10 to 10000, preferably 30 to 2000, and still more preferably 150 to 500. The component (b-3) can be used in an amount of, in terms of the molar ratio [(b-3)/M] between the component (b-3) and the entire transition metal atom (M) in the component (a), normally 10 to 10000, preferably 30 to 2000, and still more preferably 150 to 500.

In the case of using the component (c), the component (c) can be used in an amount of normally 0.002 to 500, preferably 0.01 to 60, in terms of the molar ratio [Al/(c)] between the aluminum atom in the component (b-1) and the component (c) when the component (b) is the component (b-1), in an amount of normally 0.002 to 500, preferably 0.01 to 60, in terms of the molar ratio [(b-2)/(c)] between the component (b-2) and the component (c) when the component (b) is the component (b-2), and in an amount of normally 0.002 to 500, preferably 0.01 to 60, in terms of the molar ratio [(b-3)/(c)] between the component (b-3) and the component (c) when the component (b) is the component (b-3).

The polymerization temperature is normally −50 to 200° C., preferably 0 to 100° C., and more preferably 20 to 100° C. The polymerization pressure is under conditions of normally ordinary pressure to a gauge pressure of 10 MPa, and preferably ordinary pressure to a gauge pressure of 5 MPa. The polymerization reaction can be carried out by any of batch, semicontinuous, and continuous methods. Hydrogen can be added to the polymerization system for the purpose of controlling the molecular weight of the polymer to be produced or the polymerization activity, and an appropriate amount of hydrogen to be added is about 0.001 to 100 NL per kg of olefins.

As for the polymerization conditions, it is also possible to adopt multistage polymerization in which polymerization is carried out in two or more stages with different reaction conditions. For example, it is possible to obtain a polymer with the desired molecular weight distribution or composition distribution by performing stepwise polymerization under two kinds of conditions that differ in the amount of hydrogen to be used or in the ratio between 4-methyl-1-pentene and the linear α-olefin having 2 to 20 carbon atoms.

For example, the mixture of the copolymers (A) and (B) can be produced by the multistage polymerization method having the steps of: (1) producing the 4-methyl-1-pentene copolymer (A) by slurry polymerization; and (2) producing the 4-methyl-1-pentene copolymer (B) by slurry polymerization in the presence of the copolymer (A) obtained in step (1) such that the amount of the copolymer (B) falls within the range of 5 to 90 parts by mass with respect to 100 parts by mass of the total amount of the copolymers (A) and (B).

The above multistage polymerization method has step (1) and step (2) differing with each other in polymerization conditions, but it may be two-stage polymerization of steps (1) and (2), or may be three-stage or higher polymerization comprising another step in addition to steps (1) and (2).

<<Step (1)>>

In step (1), the 4-methyl-1-pentene copolymer (A) is produced by slurry polymerization. In step (1), the ratio of the amounts of 4-methyl-1-pentene and the linear α-olefin having 2 to 20 carbon atoms to be supplied is set such that the respective amounts of constitutional units derived from them fall within the range mentioned above.

In step (1), a slurry comprising the copolymer (A) is obtained. The slurry concentration, that is, the copolymer (A) particle concentration, is normally 0.015 to 45% by mass, and is preferably 0.03 to 35% by mass.

<<Step (2)>>

In step (2), the 4-methyl-1-pentene copolymer (B) is produced by slurry polymerization in the presence of the copolymer (A) obtained in step (1). In step (2), the ratio of the amounts of 4-methyl-1-pentene and the linear α-olefin having 2 to 20 carbon atoms to be supplied is set such that the respective amounts of constitutional units derived from them fall within the range mentioned above.

In step (2), the copolymer (B) is produced such that the amount of the copolymer (B) falls within the range of 5 to 90 parts by mass with respect to 100 parts by mass of the total amount of the copolymer (A) obtained in step (1) and the copolymer (B) obtained in step (2).

In one embodiment, in step (2), to the slurry comprising the copolymer (A), 4-methyl-1-pentene and the linear α-olefin having 2 to 20 carbon atoms can be added to carry out slurry polymerization of these monomers.

In step (2), a slurry comprising particles containing the copolymer (A) and the copolymer (B) is obtained. The slurry concentration, that is, the particle concentration, is normally 3 to 50% by mass, and is preferably 5 to 40% by mass.

The above multistage polymerization method adopts slurry polymerization. The "slurry polymerization" refers to polymerization characterized by that a polymer resulting from polymerization is present without being substantially dissolved in the medium used in the polymerization, for example, in a form dispersed as fine particles in the medium.

<<Solid-Liquid Separation Step>>

By subjecting the slurry comprising 4-methyl-1-pentene polymer particles containing the copolymers (A) and (B) obtained in step (2) to solid-liquid separation, for example, by filtering the slurry, the particles can be separated and recovered.

<<Work-Up Step>>

For the 4-methyl-1-pentene polymer particles obtained by the multistage polymerization method, for example, for the particles obtained by the solid-liquid separation step, after production by the above method, if necessary, a publicly known work-up step such as a catalyst deactivation treatment step, a catalyst residue removal step, or a drying step may be carried out.

In the manner described above, the mixture of the copolymers (A) and (B) can be obtained.

<Other Polymer Components>

The resin composition of the present embodiment can further contain other polymer components other than the copolymers (A) and (B) mentioned above. Examples of the other polymer component include an α-olefin polymer (E) (note that the copolymers (A) and (B) mentioned above are excluded) and an elastomer other than them.

The α-olefin polymer (E) is, for example, a polymer of an α-olefin having 2 to 20 carbon atoms (note that the copolymers (A) and (B) mentioned above are excluded), and examples thereof include a homopolymer or copolymer of an α-olefin having 2 to 20 carbon atoms.

Examples of the α-olefin having 2 to 20 carbon atoms include, for example, linear α-olefins such as ethylene, propylene, 1-butene, 1-pentene, 1-hexene, 1-octene, 1-decene, 1-undecene, 1-dodecene, 1-tetradecene, 1-hexadecene, 1-octadecene, and 1-eicosene; and branched α-olefins such as isobutene, 3-methyl-1-butene, 3-methyl-1-pentene, 3-ethyl-1-pentene, 4-methyl-1-pentene, 4,4-dimethyl-1-pentene, 4-methyl-1-hexene, 4,4-dimethyl-1-hexene, 4-ethyl-1- hexene, and 3-ethyl-1-hexene. Among these, α-olefins having 15 or less carbon atoms are preferable, and α-olefins having 10 or less carbon atoms are more preferable.

The α-olefin polymer (E) can further have constitutional units derived from the other polymerizable compound, as mentioned above in the copolymer (A), to the extent that the purpose of the present invention is not impaired.

In the α-olefin polymer (E), the content of constitutional units derived from the other polymerizable compound is normally 10% by mol or less, preferably 5% by mol or less, and more preferably 3% by mol or less out of 100% by mol of the entire constitutional units constituting the (E).

Specific examples of the α-olefin polymer (E) include low density polyethylene; high density polyethylene; ethylene copolymers such as ethylene-propylene random copolymer, ethylene-1-butene random copolymer, ethylene-propylene-1-butene random copolymer, ethylene-1-hexene random copolymer, ethylene-1-octene random copolymer, ethylene-propylene-ethylidene norbornene random copolymer, ethylene-propylene-1-butene-ethylidene norbornene random copolymer, and ethylene-1-butene-1-octene random copolymer; propylene homopolymer; propylene copolymers such as propylene-1-butene random copolymer, propylene-1-hexene random copolymer, and propylene-1-octene random copolymer; 1-butene homopolymer; butene copolymers such as 1-butene-1-hexene random copolymer and 1-butene-1-octene random copolymer; 4-methyl-1-pentene homopolymer; and 4-methyl-1-pentene copolymers such as 4-methyl-1-pentene-1-hexene copolymer. Among these, a 4-methyl-1-pentene homopolymer and a 4-methyl-1-pentene copolymer are preferable from the viewpoint of compatibility.

The α-olefin polymer (E) has an intrinsic viscosity $[\eta]_E$ of normally 0.1 to 10 dL/g, preferably 0.5 to 5 dL/g, measured in decalin of 135° C.

In the α-olefin polymer (E), the melting point (Tm) measured with a differential scanning calorimeter (DSC) is not particularly limited, but it is preferably 60° C. or higher, and is more preferably 70 to 300° C., for reasons of heat resistance and strength.

The α-olefin polymer (E) can be produced by conventional, publicly known methods using, for example, a vanadium-based catalyst, a titanium-based catalyst, or a metallocene-based catalyst.

The resin composition of the present embodiment can contain one kind or two or more kinds of α-olefin polymers (E).

In the resin composition of the present embodiment, the content of the α-olefin polymer (E) is normally 50 parts by mass or less, and is preferably 40 parts by mass or less relative to 100 parts by mass of the contents of the copolymers (A) and (B) in total.

In one embodiment, when the resin composition of the present embodiment contains a large amount of 4-methyl-1-pentene homopolymer, the strength of the molded article to be obtained can be improved, but the stretchability may be poor. Hence, in the resin composition of the present embodiment, the content of the 4-methyl-1-pentene homopolymer is preferably 30% by mass or less, more preferably 25% by mass or less, and still more preferably 20% by mass or less.

<Additives>

The resin composition of the present invention can contain conventional, publicly known additives.

Examples of the additive include, for example, secondary antioxidants, heat resistant stabilizers, weathering stabilizers, antistatic agents, slip agents, antiblocking agents, antifogging agents, lubricants, dyes, pigments, natural oils, synthetic oils, waxes, fillers, and hydrochloric acid absorbers. The content of the additive is not particularly limited, and it is normally 0 to 50 parts by mass, and is preferably 0 to 10 parts by mass relative to 100 parts by mass of the polymer component comprising the copolymers (A), (B), and the like.

The resin composition of the present invention can contain one kind or two or more kinds of additives.

[Method for Producing Resin Composition]

A method for producing the resin composition of the present invention will be described.

The resin composition of the present invention can be obtained by, for example, mixing the copolymer (A) and copolymer (B), and if necessary, other polymer components and/or additives. The mixture of the copolymers (A) and (B) may be obtained by the multistage polymerization method mentioned above.

As for the method for mixing each component, a variety of publicly known methods can be adopted, such as a method in which each component is mixed using an apparatus such as a plastomill, a Henschel mixer, a V-blender, a ribbon blender, a tumbler, a blender, a kneader ruder; and a method in which, after the mixing described above, the resulting mixture is further melt-kneaded in an apparatus such as a single-screw extruder, a twin-screw extruder, a kneader, a Banbury mixer, and then the resulting melt-kneaded product is granulated or pulverized.

When the resin composition of the present invention is measured in a cross fractionation chromatograph (CFC) using an infrared spectrophotometer as a detector part, the amount of a component eluted in the range of 135° C. or higher in the entire amount of a component eluted in a range of 0 to 145° C. of the resin composition is preferably 20% by mass or less, more preferably 15% by mass or less, and still more preferably 10% by mass or less, from the viewpoint of improving the stretchability of the molded article to be obtained and the like. Normally, the component eluted in the range of 135° C. or higher corresponds to the 4-methyl-1-pentene homopolymer.

[Molded Article]

A molded article of the present invention comprises the resin composition of the present invention, and is obtained by publicly known thermoforming methods, such as extrusion molding, injection molding, inflation molding, blow molding, extrusion blow molding, injection blow molding, press molding, stamping molding, vacuum molding, calendar molding, filament molding, foam molding, and powder slush molding.

The molded article of the present invention may be a molded article obtained by firstly obtaining a primary molded article by a method such as extrusion molding, injection molding, or solution casting, and then further processing it by a method such as blow molding or stretching.

The molded article of the present invention is preferably a film. In addition to the conventional properties of 4-methyl-1-pentene copolymers such as heat resistance, mechanical physical properties, electrical properties (dielectric breakdown strength and the like), and mold release properties, the film of the present invention has a small surface roughness, is smooth, and has excellent stretchability and flexibility. The film of the present invention comprises the resin composition of the present invention, and can be obtained by, for example, melt-molding it normally in the range of 180 to 300° C. The thickness of the film of the present invention is normally 1000 μm or less, preferably 100 μm or less, more preferably 50 μm or less, still more preferably 30 μm or less, and particularly preferably 15 μm or less. The lower limit of the thickness of the film of the present invention is not particularly limited, and it is normally 1 μm.

In the film of the present invention, the surface roughness (Ra) of the film is preferably less than 100 nm, more preferably 60 nm or less, and still more preferably 40 nm or less. Since it is preferable for the film of the present invention to be smoother, there is no particular limitation on the lower limit of the surface roughness (Ra) of the film, and it is preferable that it should be close to 0.

In the film of the present invention, the surface roughness (Rz) of the film is preferably less than 500 nm, more preferably 400 nm or less, and still more preferably 300 nm or less. Since it is preferable for the film of the present invention to be smoother, there is no particular limitation on the lower limit of the surface roughness (Rz) of the film, and it is preferable that it should be close to 0.

The film of the present invention contains at least two 4-methyl-1-pentene copolymers such as the 4-methyl-1-pentene copolymer (A) and the 4-methyl-1-pentene copolymer (B).

That is, examples of the film of the present invention can include films that satisfy the following requirements (I) to (III):

(I) containing at least two 4-methyl-1-pentene copolymers;

(II) having a surface roughness (Ra) of less than 100 nm; and (III) having a surface roughness (Rz) of less than 500 nm.

The film of the present invention may be, for example, not only a single layer film obtained from the resin composition of the present invention, but also a laminated film having a layer obtained from the resin composition of the present invention. Examples of the method for obtaining a laminated film include, for example, a method in which a surface layer film is obtained in advance by T-die molding or inflation molding and another layer is laminated onto the surface layer film by a publicly known lamination method such as extrusion lamination or extrusion coating; a method in which a plurality of films are independently molded and then each film is laminated by dry lamination; and a co-extrusion molding method in which a plurality of components are fed into a multilayer extruder and molded. The surface layer film described above is, for example, a layer obtained from the resin composition of the present invention.

Examples of the application of the film of the present invention include the following:

- stretched films: for example, films for capacitors;
- semiconductor process films: for example, dicing tapes, back grind tapes, die bonding films, and films for polarizing plates;
- packaging films: for example, food packaging films, stretch films, wrap films, breathable films, shrink films, and easy peel films;
- separators: for example, battery separators, separators for lithium ion batteries, electrolyte membranes for fuel cells, and adhesive or adhesive separators;
- films for electronic components: for example, diffusion films, reflection films, radiation-resistant films, γ-ray resistant films, and porous films;
- mold releasing films: for example, mold releasing films for flexible printed circuit boards, ACM substrates, rigid flexible substrates, advanced composite materials, carbon fiber composite material curing, glass fiber composite material curing, aramid fiber composite material curing, nanocomposite material curing, filler curing, urethane curing, epoxy curing, semiconductor encapsulation, polarizing plates, diffusion sheets, prism sheets, reflection sheets, fuel cells, and various rubber sheets;
- surface protecting films: for example, protecting films for polarizing plates, liquid crystal panels, optical components, lenses, electric components or electric appliances, mobile phones, personal computers or touch panels, and masking films; and building material films: for example, window films for building materials, films for laminated glass, bulletproof materials, films for bulletproof glass, heat shield sheets, and heat shield films.

The film of the present invention is preferably a stretched film, and for example, it is preferably a stretched film obtained by firstly molding the resin composition of the present invention by the T-die extrusion molding method or the like into a film-like or sheet-like primary molded article, and then further subjecting it to uniaxial or biaxial stretching. The stretching ratio in the MD direction and the TD direction can be each independently 1.05 to 20 times.

Examples of the specific application of stretched films include films for capacitors. For films for capacitors, film thinning by stretching and higher strength by orientation may be required. By using the resin composition of the present invention, a film for capacitors with excellent thin film processability and high strength can be obtained. In addition, the film for capacitors using the resin composition of the present invention tends to have a small surface roughness, have excellent smoothness, and be able to maintain transparency even after stretching.

[Film for Capacitors]

The thickness of the film for capacitors of the present invention is preferably 1 to 20 μm, more preferably 2 to 15 μm, and still more preferably 2.5 to 10 μm.

In the film for capacitors of the present invention, the ratio V (120° C.)/V (23° C.) between the dielectric breakdown strength at 23° C., V (23° C.), and the dielectric breakdown strength at 120° C., V (120° C.), is preferably 0.50 or more, more preferably 0.55 or more, and still more preferably 0.60 or more. In such a mode, the electrical properties under a long-term charge are stable, and the film is useful as a capacitor. Although the higher the upper limit value of the above ratio, the more excellent the electrical properties, it may be 0.95 in one embodiment.

In the film for capacitors of the present invention, the dielectric breakdown strength at 120° C., V (120° C.), is preferably 200 kV/mm or more, and is more preferably 250 kV/mm or more. The upper limit value of the dielectric breakdown strength V (120° C.) is not particularly limited, and in one embodiment, it may be 700 kV/mm.

Details of the measurement conditions for the physical properties will be given in the Examples section.

[Method for Producing Film for Capacitors]

The film for capacitors of the present invention is obtained by subjecting the film composed of the resin composition to biaxial stretching. More specifically, the film for capacitors is produced by firstly forming a film using the resin composition by, for example, the T-die extrusion molding method or the like in the range of 180 to 300° C., and then subjecting this film to biaxial stretching.

The stretching ratio in terms of area is preferably 1.1 to 100 times, more preferably 2 to 90 times, still more preferably 4 to 80 times, and particularly preferably 10 to 60 times.

When the stretching ratio is within the above range, it is easier for the electrical properties necessary for the film capacitor to be expressed.

The stretching method may be any method of the sequential biaxial stretching method or the simultaneous biaxial stretching method, but the sequential biaxial stretching method is preferable in terms of film production stability and thickness uniformity.

In the case of the sequential biaxial stretching method, for example, an unstretched film is obtained by extruding the resin composition by the T-die extrusion molding method or the like onto a cooling roll. Next, this unstretched film is passed through a preheating roll set at a predetermined stretching temperature and stretched in the film longitudinal direction (MD direction) (longitudinal stretching). Then, it is stretched in the film width direction (TD direction) while passed through a heating oven set at a predetermined stretching temperature (transverse stretching).

It is preferable that the stretching temperature for both longitudinal stretching and transverse stretching should be between the glass transition temperature (Tg) and the melting point (Tm) of the polymer used for stretching such as the 4-methyl-1-pentene copolymer (A). A film exhibiting the desired electrical properties is easily obtained when stretching is performed at a stretching temperature of 80° C. to 210° C. The above stretching temperature is preferably 85° C. to 210° C., more preferably 90° C. to 210° C., and particularly preferably 90° C. to 180° C. The stretching ratio in the film longitudinal direction and the film width direction is each independently, normally 1.2 to 11.0 times, preferably 1.4 to 9.5 times, and more preferably 2 to 9 times.

In addition, after the biaxial stretching, re-stretching may be performed in the film longitudinal direction or in the film width direction, or in the film longitudinal direction and film width direction. Also, after the biaxial stretching, an annealing treatment may be carried out. The annealing temperature is normally 100 to 230° C., and is preferably 130 to 220° C.

EXAMPLES

Hereinafter, the present invention will be described in more detail with reference to Examples. However, the present invention is not limited by these Examples.

[Methods for Measuring Various Physical Properties]

<Contents of Constitutional Units in 4-Methyl-1-Pentene Copolymer>

The amount of constitutional units derived from 4-methyl-1-pentene (4-methyl-1-pentene content) and the amount of constitutional units derived from the α-olefin other than 4-methyl-1-pentene (α-olefin content) were calculated from the $^{13}$C-NMR spectrum using the following apparatus and conditions.

The measurement was performed using a nuclear magnetic resonance apparatus, ECP500 model manufactured by JEOL Ltd., under the following conditions: solvent: a mixed solvent of o-dichlorobenzene/hexadeuterobenzene (80/20% by volume); sample concentration: 55 mg/0.6 mL; measurement temperature: 120° C.; observed nucleus: 13 C (125 MHz); sequence: single-pulse proton decoupling; pulse width: 4.7 μsec (45° pulse); repetition time: 5.5 sec; number of scans: 10,000 or more; and chemical shift reference value: 27.50 ppm. From the obtained $^{13}$C-NMR spectrum, the compositions of 4-methyl-1-pentene, and the α-olefin were quantified.

<Intrinsic Viscosity [η]>

The intrinsic viscosity [η] was measured using a decalin solvent at 135° C. That is, about 20 mg of polymerized powder, pellets, or resin mass was dissolved in 15 ml of decalin, and the specific viscosity $\eta_{sp}$ was measured in an oil bath at 135° C. After diluting this decalin solution by adding 5 ml of a decalin solvent, the specific viscosity $\eta_{sp}$ was measured in the same manner. This dilution operation was further repeated two times, and the value of $\eta_{sp}/C$ when the concentration (C) was extrapolated to zero was determined as the intrinsic viscosity (see the expression below).

$$[\eta]=\lim(\eta_{sp}/C)(C\rightarrow 0)$$

<CFC and Molecular Weight Measurements>

The CFC and molecular weight measurements were carried out under the following conditions.

Apparatus: CFC2 cross fractionation chromatograph (Polymer Characterization, S.A.)

Detector (built-in): IR4 infrared spectrophotometer (Polymer Characterization, S.A.)

Detection wavelength: 3.42 μm (2,920 cm$^{-1}$); fixed Sample concentration: 30 mg/30 mL (diluted with o-dichlorobenzene (ODCB))

Injection volume: 0.5 mL

Temperature conditions: the temperature was increased to 145° C. at 40° C./min and kept for 30 minutes. Then, after decreasing the temperature to 0° C. at 1° C./min and kept for 60 minutes, the amount of an eluate for each elution segment was evaluated. Temperature change among the segments was set to 40° C./min.

Elution segments: The boundaries of the elution segments were set at 0, 5, 10, 15, 20, 25, 30, 35, 50, 70, 90, 95, 100, 102, 104, 106° C. for the range of 0 to 108° C., every 1° C. for the range of 108° C. to 135° C., and 135, 140, 145° C. for the range of 135 to 145° C., and the amount of an eluate at each segment was evaluated.

GPC column: Shodex HT-806M×3 (manufactured by Showa Denko K.K.)

GPC column temperature: 145° C.

GPC column calibration: monodisperse polystyrene (Tosoh Corp.)

Molecular weight calibration method: preparation calibration method (in terms of polystyrene)

Mobile phase: o-dichlorobenzene (ODCB) supplemented with BHT

Flow rate: 1.0 mL/min

Production Examples 1 to 24

In accordance with the polymerization method described in Comparative Example 1 ([0158]) of WO 2017/150265, 4-methyl-1-pentene copolymers (A-1) to (A-12) and (B-1) to (B-12) were obtained by changing the α-olefin to the α-olefins described in Table 1-1 and Table 1-2, and changing the proportions of 4-methyl-1-pentene, the α-olefins, and hydrogen to be used such that the physical properties of the copolymers to be obtained were the values in Table 1-1 and Table 1-2.

TABLE 1-1

| | | Prod. Ex. 1 | Prod. Ex. 2 | Prod. Ex. 3 | Prod. Ex. 4 |
|---|---|---|---|---|---|
| 4-methyl-1-pentene copolymer (A) | | (A-1) | (A-2) | (A-3) | (A-4) |
| 4-methyl-1-pentene content (U1) | mol % | 98.6 | 98.6 | 98.4 | 98.3 |
| α-olefin type | | 1-hexadecene 1-octadecene | 1-hexadecene 1-octadecene | 1-hexadecene 1-octadecene | 1-hexadecene 1-octadecene |
| α-olefin content (U2) | mol % | 1.4 | 1.4 | 1.6 | 1.7 |
| CFC data Presence or absence of a peak of the amount of a component eluted at 100 to 140° C. | | Present | Present | Present | Present |
| Presence or absence of a peak of the amount of a component eluted at 0 to less than 100° C. | | Absent | Absent | Absent | Absent |
| Mw/Mn of a component eluted at 100 to 140° C. | | 4.1 | 3.5 | 3.4 | 3.5 |
| Mw/Mn of a component eluted at 0 to less than 100° C. | | — | — | — | — |
| Intrinsic viscosity $[\eta]_A$ | dL/g | 1.6 | 1.8 | 2.7 | 2.5 |

| | | Prod. Ex. 5 | Prod. Ex. 6 | Prod. Ex. 7 | Prod. Ex. 8 |
|---|---|---|---|---|---|
| 4-methyl-1-pentene copolymer (A) | | (A-5) | (A-6) | (A-7) | (A-8) |
| 4-methyl-1-pentene content (U1) | mol % | 99.1 | 99.7 | 98.5 | 98.8 |
| α-olefin type | | 1-hexadecene 1-octadecene | 1-hexadecene 1-octadecene | 1-hexadecene 1-octadecene | 1-hexadecene 1-octadecene |
| α-olefin content (U2) | mol % | 0.9 | 0.3 | 1.5 | 1.2 |
| CFC data Presence or absence of a peak of the amount of a component eluted at 100 to 140° C. | | Present | Present | Present | Present |
| Presence or absence of a peak of the amount of a component eluted at 0 to less than 100° C. | | Absent | Absent | Absent | Absent |
| Mw/Mn of a component eluted at 100 to 140° C. | | 2.3 | 2.6 | 3.2 | 3.4 |
| Mw/Mn of a component eluted at 0 to less than 100° C. | | — | — | — | — |
| Intrinsic viscosity $[\eta]_A$ | dL/g | 2.9 | 2.0 | 2.6 | 2.6 |

| | | Prod. Ex. 9 | Prod. Ex. 10 | Prod. Ex. 11 | Prod. Ex. 12 |
|---|---|---|---|---|---|
| 4-methyl-1-pentene copolymer (A) | | (A-9) | (A-10) | (A-11) | (A-12) |
| 4-methyl-1-pentene content (U1) | mol % | 98.5 | 98.6 | 99.5 | 98.2 |
| α-olefin type | | 1-hexadecene 1-octadecene | 1-hexadecene 1-octadecene | 1-hexadecene 1-octadecene | 1-hexadecene 1-octadecene |
| α-olefin content (U2) | mol % | 1.5 | 1.4 | 0.5 | 1.8 |
| CFC data Presence or absence of a peak of the amount of a component eluted at 100 to 140° C. | | Present | Present | Present | Present |
| Presence or absence of a peak of the amount of a component eluted at 0 to less than 100° C. | | Absent | Absent | Absent | Absent |
| Mw/Mn of a component eluted at 100 to 140° C. | | 3.3 | 3.4 | 3.5 | 4.1 |
| Mw/Mn of a component eluted at 0 to less than 100° C. | | — | — | — | — |
| Intrinsic viscosity $[\eta]_A$ | dL/g | 2.1 | 2.6 | 1.5 | 2.2 |

TABLE 1-2

| | | Prod. Ex. 13 | Prod. Ex. 14 | Prod. Ex. 15 | Prod. Ex. 16 |
|---|---|---|---|---|---|
| 4-methyl-1-pentene copolymer (B) | | (B-1) | (B-2) | (B-3) | (B-4) |
| 4-methyl-1-pentene content (U3) | mol % | 95.4 | 95.0 | 95.1 | 96.3 |
| α-olefin type | | 1-hexadecene 1-octadecene | 1-hexadecene 1-octadecene | 1-hexadecene 1-octadecene | 1-hexadecene 1-octadecene |

TABLE 1-2-continued

| | | | | | | |
|---|---|---|---|---|---|---|
| | α-olefin content(U4) | mol % | 4.6 | 5.0 | 4.9 | 3.7 |
| CFC data | Presence or absence of a peak of the amount of a component eluted at 100 to 140° C. | | Absent | Absent | Absent | Absent |
| | Presence or absence of a peak of the amount of a component eluted at 0 to less than 100° C. | | Present | Present | Present | Present |
| | Mw/Mn of a component eluted at 100 to 140° C. | | — | — | — | — |
| | Mw/Mn of a component eluted at 0 to less than 100° C. | | 5.0 | 3.8 | 3.5 | 4.1 |
| | Intrinsic viscosity $[\eta]_B$ | dL/g | 4.3 | 4.8 | 4.7 | 4.7 |
| | | | Prod. Ex. 17 | Prod. Ex. 18 | Prod. Ex. 19 | Prod. Ex. 20 |
| | 4-methyl-1-pentene copolymer (B) | | (B-5) | (B-6) | (B-7) | (B-8) |
| | 4-methyl-1-pentene content (U3) | mol % | 90.5 | 89.3 | 94.6 | 96.1 |
| | α-olefin type | | 1-hexadecene 1-octadecene | 1-hexadecene 1-octadecene | 1-hexadecene 1-octadecene | 1-hexadecene 1-octadecene |
| | α-olefin content(U4) | mol % | 9.5 | 10.7 | 5.4 | 3.9 |
| CFC data | Presence or absence of a peak of the amount of a component eluted at 100 to 140° C. | | Absent | Absent | Absent | Absent |
| | Presence or absence of a peak of the amount of a component eluted at 0 to less than 100° C. | | Present | Present | Present | Present |
| | Mw/Mn of a component eluted at 100 to 140° C. | | — | — | — | — |
| | Mw/Mn of a component eluted at 0 to less than 100° C. | | 2.5 | 2.7 | 3.8 | 3.7 |
| | Intrinsic viscosity $[\eta]_B$ | dL/g | 2.1 | 4.1 | 4.6 | 4.8 |
| | | | Prod. Ex. 21 | Prod. Ex. 22 | Prod. Ex. 23 | Prod. Ex. 24 |
| | 4-methyl-1-pentene copolymer (B) | | (B-9) | (B-10) | (B-11) | (B-12) |
| | 4-methyl-1-pentene content (U3) | mol % | 95.4 | 95.6 | 96.4 | 96.0 |
| | α-olefin type | | 1-hexadecene 1-octadecene | 1-hexadecene 1-octadecene | 1-hexadecene 1-octadecene | 1-hexadecene 1-octadecene |
| | α-olefin content (U4) | mol % | 4.6 | 4.4 | 3.6 | 4.0 |
| CFC data | Presence or absence of a peak of the amount of a component eluted at 100 to 140° C. | | Absent | Absent | Absent | Absent |
| | Presence or absence of a peak of the amount of a component eluted at 0 to less than 100° C. | | Present | Present | Present | Present |
| | Mw/Mn of a component eluted at 100 to 140° C. | | — | — | — | — |
| | Mw/Mn of a component eluted at 0 to less than 100° C. | | 4.1 | 3.5 | 3.9 | 4.8 |
| | Intrinsic viscosity $[\eta]_B$ | dL/g | 4.6 | 4.7 | 4.3 | 5.3 |

Example 1

[Production of Resin Composition]

To 35 parts by mass of the copolymer (A-1) and 65 parts by mass of the copolymer (B-1) obtained in the above Production Examples, 0.1 parts by mass of tri(2,4-di-t-butylphenyl) phosphate as a secondary antioxidant and 0.1 parts by mass of n-octadecyl-3-(4'-hydroxy-3',5'-di-t-butylphenyl) propionate as a heat resistant stabilizer were mixed in.

Then, the resulting mixture was granulated under conditions with a set temperature of 270° C. and an amount of the resin extruded of 60 g/min at 200 rpm using a twin-screw extruder BT-30 manufactured by Research Laboratory of Plastics Technology Co., Ltd. (screw diameter: 30 mmφ, L/D=46), to give pellets of the resin composition.

[Preparation of Film]

The obtained pellets were supplied to a single-screw extruder (manufactured by Tanaka Iron Works Co., Ltd.), melt-kneaded in a cylinder at 270° C., and then melt-extruded into a film form through a T-type slit die with a die temperature of 270° C. Next, the obtained film was taken over under conditions with a take-over speed of 0.9 m/min while adhered onto a metal cooling roll controlled at 80° C. with air pressure. An unstretched film that had been cooled and solidified with a thickness of 200 μm was obtained.

[Stretching of Film]

The obtained unstretched film was preheated with a heated metal roll to increase the film temperature to 160° C., and then it was longitudinally stretched to 3 times the length between a pair of rolls with different peripheral speeds to, give a uniaxially stretched film. Then, the uniaxially stretched film was grasped with clips at both ends in the width direction, led to a heating oven, preheated to 160° C., and laterally stretched to 5 times in the width direction, to give a biaxially stretched film. Thereafter, the biaxially stretched film was heated to 200° C. and subjected to an annealing treatment. The biaxially stretched film thus obtained was cut at both ends by razor cutting using a razor blade, and then wound into a roll shape, to give a sample for evaluation.

Using this sample for evaluation, the physical properties below were evaluated.

Examples 2 to 10 and Comparative Examples 1 to 2

Unstretched films and biaxially stretched films were obtained in the same manner as in Example 1, except that the copolymers described in Table 2 were mixed in as the 4-methyl-1-pentene copolymers and their amounts to be mixed in were changed to those described in Table 2. Thereafter, samples for evaluation were obtained in the same manner as in Example 1.

Examples 11 to 14

4-Methyl-1-pentene copolymers, unstretched films, and biaxially stretched films were obtained in the same manner as in Example 3, except that the stretching conditions were changed to those described in Table 2. Thereafter, samples for evaluation were obtained in the same manner as in Example 1.

Using these samples for evaluation, the physical properties below were evaluated.

<Intrinsic Viscosity [η]>

The intrinsic viscosity [η] was measured by the method described above.

<Melting Point (Tm)>

For the measurement, the biaxially stretched film obtained as described above was used as the sample. Using a DSC measurement apparatus (DSC220C) manufactured by Seiko Instruments Inc., the melting point was measured according to the following procedure. First, about 5 mg of the sample was placed in an aluminum pan for measurement and sealed. The temperature of the sample was increased to 290° C. at 100° C./min, held at 290° C. for 5 min, then decreased to −100° C. at 10° C./min, and then increased from −100° C. to 290° C. at 10° C./min. The melting point (Tm) was calculated from the peak summit of the crystal melting peak in the calorimetric curve at the second temperature increase. When a plurality of peaks were detected, one with the highest temperature was taken as the melting point (Tm).

<Dielectric Breakdown Strength>

The dielectric breakdown strength (V/μm) was measured in accordance with ASTM-D149, using a dielectric breakdown tester manufactured by Yamayoshikenki Co., Ltd. For the above sample for evaluation, the dielectric breakdown withstand voltage was measured at 23° C. and 120° C. by applying the voltage at a voltage increase rate of 500 V/sec, and the dielectric breakdown strength (V/μm) was determined. Next, from the dielectric breakdown strength at 23° C., V (23° C.), and the dielectric breakdown strength at 120° C., V (120° C.), the ratio V (120° C.)/V (23° C.) between them was calculated.

<Average Thickness>

The thickness of the sample for evaluation was measured at 10 points in the width direction and 10 points in the length direction using a micrometer, and the average value thereof was used as the thickness of the biaxially stretched film or unstretched film.

<Surface Roughness Ra>

Using a surface roughness meter manufactured by Tokyo Seimitsu Co., Ltd., the state of unevenness on the surface of the sample for evaluation was evaluated as a roughness curve. In the direction of its average line, a portion of the roughness curve, the portion having the measurement length (1), was extracted, and when the x-axis was taken in the direction of the average line of this extracted portion, the y-axis was taken in the direction of the longitudinal magnification, and the roughness curve was expressed by y=f(x), the value determined by the following expression, expressed in nanometers (nm), was used as Ra. The measurement length was 10 mm.

Ra being less than 100 was evaluated as AA, and Ra being 100 or more was evaluated as BB.

$$Ra = \frac{1}{\ell}\int_0^{\ell} |f(x)|dx \quad \text{[Math. 1]}$$

<Surface Roughness Rz>

Using a surface roughness meter manufactured by Tokyo Seimitsu Co., Ltd., the state of unevenness on the surface of the sample for evaluation was evaluated as a roughness curve. In the direction of its average line, a portion having only the measurement length was extracted from the roughness curve, and the measurement was performed in the direction of the longitudinal magnification from the average line of this extracted area. The sum of the average value of the absolute elevation (Yp) of the highest to fifth highest peaks and the average value of the absolute elevation (Yv) of the lowest to fifth lowest valley bottoms was determined as in the following expression, and this value, expressed in nanometers (nm), was used as Rz. The measurement length was 10 mm.

Rz being less than 500 was evaluated as AA, and Rz being 500 or more was evaluated as BB.

$$Rz = \frac{|Yp1 + Yp2 + Yp3 + Yp4 + Yp5 + Yv1 + Yv2 + Yv3 + Yv4 + Yv5|}{5} \quad \text{[Math. 2]}$$

The evaluation results of the above physical properties for each film are shown in Table 2.

TABLE 2

| | | Example | | | |
|---|---|---|---|---|---|
| | | Ex. 1 | Ex. 2 | Ex. 3 | Ex. 4 |
| Composition | Copolymer (A) | (A-1) | (A-2) | (A-3) | (A-4) |
| | Copolymer (B) | (B-1) | (B-2) | (B-3) | (B-4) |

TABLE 2-continued

| | | | | | | |
|---|---|---|---|---|---|---|
| | Weight fraction of copolymer A | mass % | 35 | 34 | 34 | 32 |
| | Weight fraction of copolymer B | mass % | 65 | 66 | 66 | 68 |
| | U4 − U2 | mol % | 3.2 | 3.6 | 3.3 | 2.0 |
| | Total comonomer amount | mol % | 3.4 | 3.7 | 3.7 | 3.0 |
| | Intrinsic viscosity | dl/g | 3.4 | 3.8 | 4.0 | 4.1 |
| Stretching conditions | Stretching mode | | Sequential | Sequential | Sequential | Sequential |
| | MD direction | Temperature, ° C. | 160 | 160 | 160 | 160 |
| | | Ratio | 3 | 3 | 3 | 3 |
| | TD direction | Temperature, ° C. | 160 | 160 | 160 | 160 |
| | | Ratio | 5 | 5 | 5 | 5 |
| Film physical properties | Melting point | ° C. | 222 | 222 | 219 | 216 |
| | Dielectric breakdown strength V (23° C.) | V/μm | 541 | 503 | 517 | 450 |
| | Dielectric breakdown strength V (120° C.) | V/μm | 346 | 331 | 354 | 283 |
| | V(120° C.)/V(23° C.) | — | 0.64 | 0.66 | 0.68 | 0.63 |
| | Average thickness | μm | 10 | 8 | 12 | 10 |
| | Surface roughness Ra | nm | 30 | 24 | 23 | 36 |
| | Surface roughness Ra | — | AA | AA | AA | AA |
| | Surface roughness Rz | nm | 210 | 180 | 160 | 240 |
| | Surface roughness Rz | — | AA | AA | AA | AA |

| | | | Example | | | |
|---|---|---|---|---|---|---|
| | | | Ex. 5 | Ex. 6 | Ex. 7 | Ex. 8 |
| Composition | Copolymer (A) | | (A-7) | (A-8) | (A-9) | (A-10) |
| | Copolymer (B) | | (B-7 | (B-8) | (B-9) | (B-10) |
| | Weight fraction of copolymer A | mass % | 33 | 32 | 28 | 32 |
| | Weight fraction of copolymer B | mass % | 67 | 68 | 72 | 68 |
| | U4 − U2 | mol % | 3.9 | 2.7 | 3.1 | 3.0 |
| | Total comonomer amount | mol % | 4.1 | 3.0 | 4.6 | 3.4 |
| | Intrinsic viscosity | dl/g | 3.9 | 4.1 | 3.9 | 4.0 |
| Stretching conditions | Stretching mode | | Sequential | Sequential | Sequential | Sequential |
| | MD direction | Temperature, ° C. | 160 | 160 | 160 | 160 |
| | | Ratio | 3 | 3 | 3 | 3 |
| | TD direction | Temperature, ° C. | 160 | 160 | 160 | 160 |
| | | Ratio | 5 | 5 | 5 | 5 |
| Film physical properties | Melting point | ° C. | 220 | 222 | 221 | 220 |
| | Dielectric breakdown strength V (23° C.) | V/μm | 425 | 467 | 401 | 436 |
| | Dielectric breakdown strength V (120° C.) | V/μm | 260 | 370 | 282 | 300 |
| | V(120° C.)/V(23° C.) | — | 0.61 | 0.79 | 0.70 | 0.69 |
| | Average thickness | μm | 8 | 8 | 8 | 8 |
| | Surface roughness Ra | nm | 25 | 32 | 30 | 27 |
| | Surface roughness Ra | — | AA | AA | AA | AA |
| | Surface roughness Rz | nm | 190 | 210 | 210 | 200 |
| | Surface roughness Rz | — | AA | AA | AA | AA |

| | | | Example | | | |
|---|---|---|---|---|---|---|
| | | | Ex. 9 | Ex. 10 | Ex. 11 | Ex. 12 |
| Composition | Copolymer (A) | | (A-11) | (A-12) | (A-3) | (A-3) |
| | Copolymer (B) | | (B-11) | (B-12) | (B-3 | (B-3) |
| | Weight fraction of copolymer A | mass % | 33 | 30 | 34 | 34 |
| | Weight fraction of copolymer B | mass % | 67 | 70 | 66 | 66 |
| | U4 − U2 | mol % | 3.1 | 2.2 | 3.3 | 3.3 |
| | Total comonomer amount | mol % | 2.6 | 3.3 | 3.7 | 3.7 |
| | Intrinsic viscosity | dl/g | 3.4 | 4.4 | 4.0 | 4.0 |
| Stretching conditions | Stretching mode | | Sequential | Sequential | Sequential | Sequential |
| | MD direction | Temperature, ° C. | 160 | 160 | 90 | 90 |
| | | Ratio | 3 | 3 | 3 | 2 |
| | TD direction | Temperature, ° C. | 160 | 160 | 160 | 160 |
| | | Ratio | 5 | 5 | 5 | 6 |
| Film physical properties | Melting point | ° C. | 232 | 213 | 219 | 219 |
| | Dielectric breakdown strength V (23° C.) | V/μm | 480 | 423 | 590 | 700 |
| | Dielectric breakdown strength V (120° C.) | V/μm | 376 | 373 | 407 | 490 |

TABLE 2-continued

| | | | | | | |
|---|---|---|---|---|---|---|
| | V(120° C.)/V(23° C.) | — | 0.78 | 0.88 | 0.69 | 0.70 |
| | Average thickness | μm | 12 | 12 | 9 | 11 |
| | Surface roughness Ra | nm | 32 | 30 | 27 | 38 |
| | Surface roughness Ra | — | AA | AA | AA | AA |
| | Surface roughness Rz | nm | 250 | 220 | 190 | 270 |
| | Surface roughness Rz | — | AA | AA | AA | AA |

| | | | Example | | Comparative Example | |
|---|---|---|---|---|---|---|
| | | | Ex. 13 | Ex. 14 | Comp. Ex. 1 | Comp. Ex. 2 |
| Composition | Copolymer (A) | | (A-3) | (A-3) | (A-5 | (A-6) |
| | Copolymer (B) | | (B-3) | (B-3) | (B-5) | (B-6) |
| | Weight fraction of copolymer A | mass % | 34 | 34 | 70 | 61 |
| | Weight fraction of copolymer B | mass % | 66 | 66 | 30 | 39 |
| | U4 − U2 | mol % | 3.3 | 3.3 | 8.6 | 10.4 |
| | Total comonomer amount | mol % | 3.7 | 3.7 | 3.2 | 4.0 |
| | Intrinsic viscosity | dl/g | 4.0 | 4.0 | 2.7 | 2.8 |
| Stretching conditions | Stretching mode | | Sequential | Sequential | Sequential | Sequential |
| | MD direction | Temperature, ° C. | 160 | 200 | 160 | 160 |
| | | Ratio | 2 | 3 | 3 | 3 |
| | TD direction | Temperature, ° C. | 160 | 200 | 160 | 160 |
| | | Ratio | 6 | 5 | 5 | 5 |
| Film physical properties | Melting point | ° C. | 219 | 219 | 223 | 228 |
| | Dielectric breakdown strength V (23° C.) | V/μm | 574 | 397 | 481 | 498 |
| | Dielectric breakdown strength V (120° C.) | V/μm | 390 | 250 | 302 | 316 |
| | V(120° C.)/V(23° C.) | — | 0.68 | 0.63 | 0.63 | 0.63 |
| | Average thickness | μm | 11 | 4.5 | 12 | 12 |
| | Surface roughness Ra | nm | 31 | 21 | 108 | 121 |
| | Surface roughness Ra | — | AA | AA | BB | BB |
| | Surface roughness Rz | nm | 220 | 130 | 611 | 620 |
| | Surface roughness Rz | — | AA | AA | BB | BB |

The invention claimed is:

1. A resin composition comprising a 4-methyl-1-pentene copolymer (A) that satisfies the following requirements (A-a) to (A-d) and a 4-methyl-1-pentene copolymer (B) that satisfies the following requirements (B-a) to (B-d), wherein the resin composition satisfies the following requirements (1) and (2):

(A-a) in the copolymer (A), an amount (U1) of constitutional units derived from 4-methyl-1-pentene is 80.0 to 99.9% by mol and a total amount (U2) of constitutional units derived from at least one selected from linear α-olefins having 2 to 20 carbon atoms is 20.0 to 0.1% by mol (provided that U1 and U2 in total is 100% by mol);

(A-b) an intrinsic viscosity $[\eta]_A$ measured in decalin of 135° C. of the copolymer (A) is 0.5 to 5.0 dL/g;

(A-c) when the copolymer (A) is measured in a cross fractionation chromatograph apparatus (CFC) using an infrared spectrophotometer as a detector part, at least one peak of an amount of a component eluted is present in a range of 100 to 140° C.;

(A-d) when the copolymer (A) is measured in the CFC, a molecular weight distribution (Mw/Mn), which is a ratio between a weight average molecular weight (Mw) and a number average molecular weight (Mn), in the component eluted in a range of 100 to 140° C. is 1.0 to 4.5;

(B-a) in the copolymer (B), an amount (U3) of constitutional units derived from 4-methyl-1-pentene is 20.0 to 98.0% by mol and a total amount (U4) of constitutional units derived from at least one selected from linear α-olefins having 2 to 20 carbon atoms is 80.0 to 2.0% by mol (provided that U3 and U4 in total is 100% by mol);

(B-b) an intrinsic viscosity $[\eta]_B$ measured in decalin of 135° C. of the copolymer (B) is 2.0 to 8.0 dL/g;

(B-c) when the copolymer (B) is measured in a cross fractionation chromatograph apparatus (CFC) using an infrared spectrophotometer as a detector part, at least one peak of an amount of a component eluted is present in a range of 0° C. or higher and lower than 100° C.;

(B-d) when the copolymer (B) is measured in the CFC, a molecular weight distribution (Mw/Mn), which is a ratio between a weight average molecular weight (Mw) and a number average molecular weight (Mn), in the component eluted in a range of 0° C. or higher and lower than 100° C. is 1.0 to 7.0;

(1) a content of the copolymer (A) is 5 parts by mass or more and less than 50 parts by mass and a content of the copolymer (B) is greater than 50 parts by mass and 95 parts by mass or less with respect to 100 parts by mass of the total content of the copolymers (A) and (B); and (2) a value (U4-U2) obtained by subtracting U2 (% by mol) described in the requirement (A-a) from U4 (% by mol) described in the requirement (B-a) is 0% by mol or more and 6.5% by mol or less.

2. The resin composition according to claim 1, wherein the linear α-olefins in the copolymers (A) and (B) are each independently a linear α-olefin having 10 to 20 carbon atoms.

3. A molded article comprising the resin composition according to claim 1.

4. A film comprising the resin composition according to claim 1.

5. The film according to claim 1, satisfying the following requirements (II) to (III):

(II) a surface roughness (Ra) of the film is less than 100 nm; and (III) a surface roughness (Rz) of the film is less than 500 nm.

6. The film according to claim 4, wherein the film is a film for capacitors.

7. The film according to claim 1, wherein the resin composition has a melting point (Tm) of 210 to 240° C.

* * * * *